No. 790,116.　　　　　　　　　　　　　　　　　Patented May 16, 1905.

UNITED STATES PATENT OFFICE.

ALFRED EINHORN, OF MUNICH, GERMANY, ASSIGNOR TO FARBWERKE, VORM. MEISTER LUCIUS & BRÜNING, OF HÖCHST-ON-THE-MAIN, GERMANY, A CORPORATION OF GERMANY.

PROCESS OF MAKING DIETHYL-BARBITURIC ACIDS.

SPECIFICATION forming part of Letters Patent No. 790,116, dated May 16, 1905.

Application filed February 25, 1905. Serial No. 247,243.

*To all whom it may concern:*

Be it known that I, ALFRED EINHORN, Dr. Rer. Nat., professor of chemistry, a citizen of the Empire of Germany, residing at Munich, Germany, have invented certain new and useful Improvements in the Manufacture of Dialkyl-Barbituric Acids, of which the following is a specification.

I have found that dialkyl-thiobarbituric acids, the transformation of which into dialkyl-barbituric acids by oxidizing agents is known, may also be transformed by heating with acids into dialkyl-barbituric acids.

Example I: Five parts, by weight, of diethyl-thiobarbituric acid are boiled with one hundred and twenty-five parts, by weight, of hydrobromic acid of the specific gravity of 1.49. The thiobarbituric acid becomes gradually dissolved. After boiling for from six to seven hours the solution is evaporated, the residue being crystallized from water to obtain diethyl-barbituric acid in a pure state.

Example II: Five parts, by weight, of diethyl-thiobarbituric acid are boiled with two hundred and fifty parts, by weight, of sulfuric acid of thirty-three per cent. strength. After about twenty-four hours the thiobarbituric acid is dissolved, the heating being continued for another day to complete the reaction. On cooling the solution the greater part of the diethyl-barbituric acid formed crystallizes and the rest contained in the solution may be obtained by shaking with ether.

In an analogous manner other dialkyl-barbituric acids may be obtained from the corresponding dialkyl-thiobarbituric acids and for the acids in the examples may be substituted other acids—such, for instance, as hydrochloric, hydriodic, phosphoric, acetic, oxalic, and sulfurous acid, (bisulfite.) Alcohol may also be added to facilitate the dissolution and transformation of the thiobarbituric acid, and to bind the hydrogen sulfid formed during the transformation salts of heavy metals can be added.

Having now described my invention, what I claim is—

1. The process herein described for the manufacture of dialkyl-barbituric acids, which consists in heating dialkyl-thiobarbituric acids with acids.

2. The process herein described for the manufacture of diethyl-barbituric acid, which consists in heating diethyl-thiobarbituric acid with acids.

3. The process herein described for the manufacture of diethyl-barbituric acid, which consists in boiling for a considerable time diethyl-thiobarbituric acid with sulfuric acid of thirty-three per cent. strength.

In testimony that I claim the foregoing as my invention I have signed my name in presence of two subscribing witnesses.

ALFRED EINHORN.

Witnesses:
　ULYSSES J. BYWATER,
　GEORG KÖRNER.